United States Patent
Nakayama et al.

(10) Patent No.: US 11,685,364 B2
(45) Date of Patent: Jun. 27, 2023

(54) VEHICLE CONTROLLER TO PRODUCE SENSE OF BEATING VIA ELECTRIC MOTOR

(71) Applicant: KAWASAKI MOTORS, LTD., Hyogo (JP)

(72) Inventors: Kyotaro Nakayama, Kakogawa (JP); Daisuke Yanase, Koto-ku (JP); Daisuke Kawai, Kobe (JP); Tomoki Tada, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 170 days.

(21) Appl. No.: 17/247,549

(22) Filed: Dec. 16, 2020

(65) Prior Publication Data
US 2021/0188247 A1 Jun. 24, 2021

(30) Foreign Application Priority Data
Dec. 18, 2019 (JP) .................. 2019-227983

(51) Int. Cl.
*B60W 20/15* (2016.01)
*B60W 10/08* (2006.01)
(Continued)

(52) U.S. Cl.
CPC ............ *B60W 20/15* (2016.01); *B60W 10/06* (2013.01); *B60W 10/08* (2013.01);
(Continued)

(58) Field of Classification Search
CPC ...... B60W 20/15; B60W 10/06; B60W 10/08; B60W 40/105; B60W 40/112; B60W 2300/36; B60W 2510/0638; B60W 2510/0657; B60W 2510/083; B60W 2520/10; B60W 2520/18; B60W 2710/0666; B60W 2710/083; B60W 20/40; B62J 45/20; H02P 6/08; H02P 2205/05; B60L 2200/12; B60L 50/15; B60L 50/16; B60L 15/20; B60L 2270/145; Y02T 10/64; Y02T 10/7072; Y02T 10/72
See application file for complete search history.

(56) References Cited

U.S. PATENT DOCUMENTS

2010/0134058 A1* 6/2010 Nagashima ............. H02P 21/06
180/65.285
2020/0198536 A1 6/2020 Krammer

FOREIGN PATENT DOCUMENTS

DE 102014219769 A1 * 3/2016 ............... B60K 1/00
DE 102014219769 A1 3/2016
(Continued)

*Primary Examiner* — Brian P Sweeney
(74) *Attorney, Agent, or Firm* — Alleman Hall Creasman & Tuttle LLP (57) ABSTRACT

A vehicle controller for a vehicle including a drive source including an electric motor includes: a sense-of-beating producer configured to acquire a total required torque which is a required torque of the entire vehicle and configured to derive a total target torque corresponding to the total required torque as applied to a predetermined engine combustion cycle; and a target motor torque deriver configured to, based on the total target torque, derive a target motor torque for torque control of the electric motor. The vehicle controller controls the electric motor based on the target motor torque.

11 Claims, 9 Drawing Sheets

(51) Int. Cl.
*B60W 10/06* (2006.01)
*B60W 40/105* (2012.01)
*B60W 40/112* (2012.01)
*B62J 45/20* (2020.01)
*H02P 6/08* (2016.01)

(52) U.S. Cl.
CPC ........ *B60W 40/105* (2013.01); *B60W 40/112* (2013.01); *B62J 45/20* (2020.02); *H02P 6/08* (2013.01); *B60W 2300/36* (2013.01); *B60W 2510/0638* (2013.01); *B60W 2510/0657* (2013.01); *B60W 2510/083* (2013.01); *B60W 2520/10* (2013.01); *B60W 2520/18* (2013.01); *B60W 2710/0666* (2013.01); *B60W 2710/083* (2013.01); *H02P 2205/05* (2013.01)

(56) References Cited

FOREIGN PATENT DOCUMENTS

| | | | |
|---|---|---|---|
| DE | 102017209280 B3 | | 10/2018 |
| JP | 2009078576 A | | 4/2009 |
| JP | 2010/023790 A | * | 2/2010 |
| JP | 2015076961 A | | 4/2015 |
| JP | 2015077849 A | | 4/2015 |
| JP | 2017140972 A | | 8/2017 |

* cited by examiner

FIG. 1

STATE TRANSITION DIAGRAM

VEHICLE CONTROLLER TO PRODUCE SENSE OF BEATING VIA ELECTRIC MOTOR

CROSS-REFERENCE TO RELATED APPLICATION

This application claims priority to and the benefit of Japanese Patent Application No. 2019-227983, filed on Dec. 18, 2019, the entire disclosure of which is incorporated herein by reference.

BACKGROUND OF THE INVENTION

Field of the Invention

The present disclosure relates to a vehicle controller for a vehicle including an electric motor as a drive source.

Description of the Related Art

Vehicles configured to include an electric motor as a drive source are known, such as electric vehicles and hybrid vehicles. Electric motors are capable of exhibiting flat torque output when generating the torque required.

Engines traditionally used as drive sources for vehicles are internal combustion engines, the torque of which fluctuates as the combustion cycle progresses. Specifically, in the engines, the torque is generated only during the combustion stroke in the combustion cycle, and thus the torque output per cylinder is intermittent. The torque fluctuation arising from the intermittent torque output creates a sense of beating specific to the engines. Some vehicle users (riders or drivers) favor the sense of beating produced from the periodic torque fluctuation associated with the engine combustion cycle.

SUMMARY OF THE INVENTION

Such users could dislike the flat torque characteristics of electric vehicles. In hybrid vehicles including an electric motor and an engine as drive sources, the required torque is divided into a torque to be output from the electric motor and a torque to be output from the engine. The torque output from the electric motor is flat, while the torque output from the engine periodically fluctuates. Thus, the overall vehicle torque characteristics resulting from the combination of the torque outputs of the electric motor and engine show a milder torque fluctuation than the torque characteristics exhibited when only the engine is in operation, and could feel unnatural to the user.

Japanese Laid-Open Patent Application Publication No. 2017-140972 and Japanese Laid-Open Patent Application Publication No. 2015-77849 each disclose performing control for increasing and decreasing the output torque of an electric motor. However, neither of these patent literatures disclose providing a sense of beating which is like that produced by an engine.

It is therefore an object of the present disclosure to provide a vehicle controller for a vehicle including an electric motor as a drive source, the vehicle controller being configured to allow the user, when the electric motor is in operation, to feel a sense of beating similar to that provided when an engine is in operation.

A vehicle controller according to an aspect of the present disclosure is a vehicle controller for a vehicle including a drive source including an electric motor, the vehicle controller including: a sense-of-beating producer configured to acquire a total required torque which is a required torque of the entire vehicle and configured to derive a total target torque corresponding to the total required torque as applied to a predetermined engine combustion cycle; a target motor torque deriver configured to, based on the total target torque, derive a target motor torque for torque control of the electric motor; and a motor controller configured to control the electric motor based on the target motor torque.

In the above configuration, the torque output from the electric motor is a target torque tailored to the predetermined engine combustion cycle. Thus, the torque output from the electric motor allows the user, when the electric motor is in operation, to feel a sense of beating similar to that provided when an engine is in operation.

The drive source may include an engine, the vehicle controller may further include a required torque allocator configured to allocate a portion of the total required torque as a target engine torque which is a target torque to be output from the engine, the sense-of-beating producer may be configured to acquire information as to a combustion cycle of the engine and derive the total target torque corresponding to the total required torque as applied to the combustion cycle of the engine, and the target motor torque deriver may include: an engine output torque waveform estimator configured to estimate an engine output torque waveform from the target engine torque, the engine output torque waveform representing an engine output torque in the combustion cycle of the engine; and a target motor torque calculator configured to calculate a motor output torque by subtracting an estimated value of the engine output torque waveform from the total target torque.

In the above configuration, the output torque waveform representing the torque output from the electric motor is tailored to the combustion cycle of the engine serving as a drive source. Thus, the output torque waveform representing the total torque which is the sum of the torque output from the electric motor and the torque output from the engine (the torque output from the entire vehicle) is tailored to the combustion cycle of the engine. As such, in a travel mode (hybrid travel mode) where drive power is generated by both the engine and the electric motor, a sense of beating can be offered to the user as if the vehicle was traveling by using the drive power of the engine alone.

The sense-of-beating producer may be configured to: acquire timing information as to the combustion cycle of the engine; determine a unit waveform from the timing information, the unit waveform being for deriving the total target torque; acquire an engine speed of the engine and a user requested value which is dependent on an operation input provided by a user in relation to an output of the vehicle; determine an amplitude from the engine speed and the user requested value, the amplitude being for deriving the total target torque; and generate a reference waveform from the unit waveform and the amplitude, the reference waveform representing a change over time in the total target torque.

In the above configuration, the total target torque can be appropriately derived to fit the actual state of the engine.

The sense-of-beating producer may be configured to determine the amplitude based on map data, the map data being for determining the amplitude according to a combination of the engine speed and the user requested value.

In the above configuration, the amplitude of the reference waveform for determining the total target torque can be finely adjusted depending on the combination of the engine speed and the accelerator opening degree.

The sense-of-beating producer may be configured to: acquire a vehicle speed of the vehicle; calculate an imaginary engine speed based on the vehicle speed; derive an imaginary engine combustion cycle based on the imaginary engine speed; and derive the total target torque corresponding to the total required torque as applied to the imaginary engine combustion cycle.

In the above configuration, since the imaginary engine combustion cycle is derived from the vehicle speed of the vehicle, a sense of beating similar to that provided by an operating engine can be created when the vehicle does not incorporate any engine or when the engine of the vehicle is at rest.

The vehicle may be a straddle vehicle having a vehicle body tiltable in a direction intersecting a travel direction of the vehicle, and the sense-of-beating producer may be configured to acquire turning information as to a turning state of the vehicle and change the amplitude according to the turning state.

In the above configuration, since the amplitude of the reference waveform for determining the total target torque is changed according to the turning state of the vehicle, a sense of beating matching the turning state can be created.

The sense-of-beating producer may be configured to increase the amplitude if the vehicle is turning and in an accelerating state and decrease the amplitude if the vehicle is turning and in a state other than the accelerating state.

In the above configuration, the sense of beating is enhanced when the vehicle is turning and in the accelerating state. Thus, the vividness of information (grip feeling) that the user receives from the vehicle which is turning and accelerating can be increased, and the operation feeling of the user can be improved. When the vehicle is turning and in the state other than the accelerating state, the sense of beating is lessened. Thus, the vividness of information that the user receives from the vehicle which is turning in the state other than the accelerating state can be reduced, and the turning of the vehicle can be kept stable.

The sense-of-beating producer may be configured to: acquire a tilt angle of the vehicle as the turning information; if the acquired tilt angle is within a predetermined first range and the vehicle is in an accelerating state, increase the amplitude as a function of the tilt angle so that the amplitude is greater than when the vehicle body is not tilted; and if the acquired tilt angle is within a predetermined second range and the vehicle is in a state other than the accelerating state, decrease the amplitude as a function of the tilt angle so that the amplitude is smaller than when the vehicle body is not tilted.

In the above configuration, the sense of beating is enhanced when the tilt angle is within the first range and the vehicle is in the accelerating state. Thus, the vividness of information (grip feeling) that the user receives from the vehicle which is turning and accelerating can be increased, and the operation feeling of the user can be improved. When the tilt angle is within the second range and the vehicle is in the state other than the accelerating state, the sense of beating is lessened. Thus, the vividness of information that the user receives from the vehicle which is turning in the state other than the accelerating state can be reduced, and the turning of the vehicle can be kept stable. Additionally, since the amplitude of the total output torque waveform is adjusted as a function of the tilt angle, a sense of beating best suited for the tilt angle can be created.

The present disclosure makes it possible for a vehicle including an electric motor as a drive source to allow the user, when the electric motor is in operation, to feel a sense of beating similar to that provided when an engine is in operation.

DETAILED DESCRIPTION OF THE EMBODIMENTS

Hereinafter, exemplary embodiments will be described with reference to the drawings.

Figure 1:
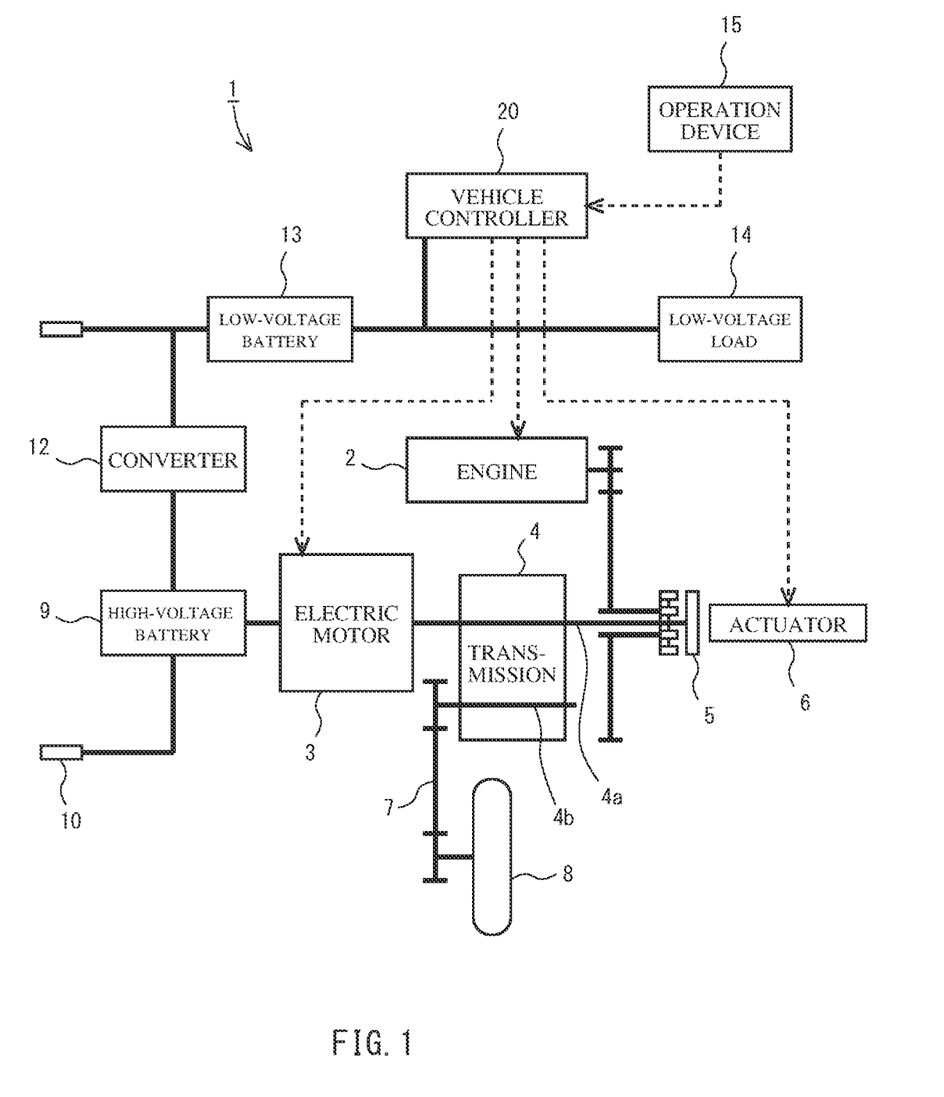
FIG. 1 is a block diagram of a vehicle according to an exemplary embodiment.

FIG. 1 is a block diagram of a vehicle 1 according to an exemplary embodiment. In the present embodiment, the vehicle 1 is a motorcycle including a rear wheel as a drive wheel 8 and a front wheel (not shown) as a driven wheel. The motorcycle is a typical example of a leaning turn-type straddle vehicle which turns with the vehicle body tilted (leaned) in the left-right direction. The vehicle 1 may be a three- or four-wheeled vehicle.

The vehicle 1 is configured as a hybrid vehicle including an electric motor 3, an engine 2, a transmission shaft (an input shaft 4a of a transmission 4 described later) for transmitting drive power of the electric motor 3 to the drive wheel 8, and a clutch 5 operable to enable and disable transmission of drive power of the engine 2 to the transmission shaft.

More specifically, as shown in FIG. 1, the vehicle 1 includes the engine 2, the electric motor 3, the transmission 4, the clutch 5, a clutch actuator 6, an output transmission member 7, the drive wheel 8, a high-voltage battery 9, a charging port 10, a converter 12, a low-voltage battery 13, and a vehicle controller 20.

The engine 2 is an internal combustion engine. The engine 2 is a drive source for driving the drive wheel 8. The electric motor 3 is a drive source for driving the drive wheel 8 together with or instead of the engine 2. The transmission 4 changes the speed of rotation produced by rotational power output from the engine 2. The transmission 4 is, for example, a manual transmission including an input shaft 4a, an output shaft 4b, and speed change gears. In the present embodiment, the transmission shaft is configured as the input shaft 4a of the transmission 4.

The clutch 5 is engaged to enable power transmission between the engine 2 and the transmission 4 and disengaged to disable power transmission between the engine 2 and the transmission 4. The clutch actuator 6 actuates the clutch 5 such that the clutch 5 switches between the engaged state and the disengaged state. The output transmission member 7 is a member through which rotational power output from the output shaft 4b of the transmission 4 is transmitted to the drive wheel 8. The output transmission member 7 is, for example, a drive chain, a drive belt, or a drive shaft.

The high-voltage battery 9 stores high-voltage electric power (e.g., 48 V) to be supplied to the electric motor 3. The charging port 10 is connected to the high-voltage battery 9. The converter 12 reduces the voltage of DC power coming from the high-voltage battery 9 and supplies the resulting DC power to the low-voltage battery 13. The low-voltage battery 13 stores low-voltage electric power (e.g., 12 V) to be supplied to the vehicle controller 20 and other low-voltage loads 14 mounted on the vehicle 1.

The vehicle controller 20 controls the engine 2, the electric motor 3, and the actuator (clutch actuator) 6 based on information obtained by various sensors. The vehicle controller 20 may consist of a single controller or may be implemented by a plurality of separate controllers. The vehicle controller 20 includes a processor, a volatile memory, a non-volatile memory (a storage 50 described later), and an I/O interface as hardware elements. The functional elements of the vehicle controller 20 will be described in detail later.

Figure 2:
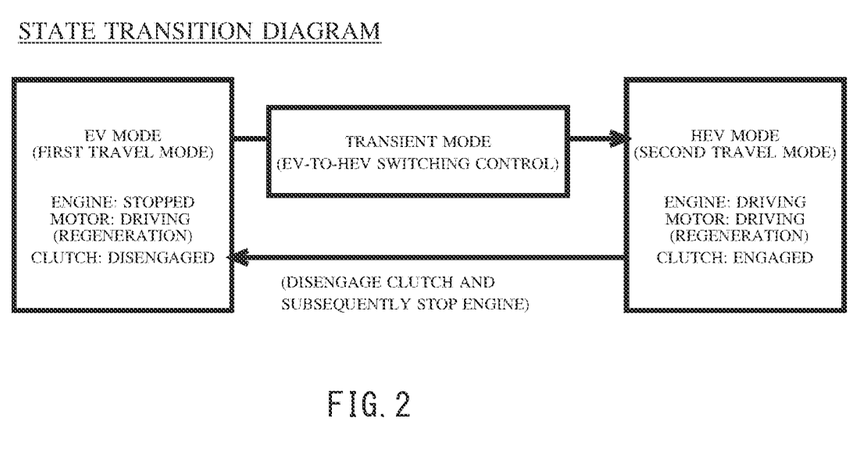
FIG. 2 is a state transition diagram illustrating travel modes of the vehicle of FIG. 1.

FIG. 2 is a state transition diagram illustrating travel modes of the vehicle 1 of FIG. 1. As shown in FIG. 2, the vehicle 1 is operable in a plurality of travel modes differing in the state of at least one of the engine 2, the electric motor 3, and the clutch 5. Specifically, the travel modes include an EV mode (first travel mode), an HEV mode (second travel mode), and a transient mode.

The EV mode (first travel mode) is a mode where the engine 2 is stopped and the drive wheel 8 is driven by drive power generated by the electric motor 3. In the EV mode, the clutch 5 is brought into the disengage state to prevent the engine 2 from causing a resistance to the operation of the electric motor 3. In the EV mode, the electric motor 3 is brought into a driving state during acceleration, while during deceleration, the electric motor 3 is brought into a regeneration state.

The HEV mode (second travel mode) is a mode where the drive wheel 8 is driven by drive power generated by the electric motor 3 and drive power generated by the engine 2. In the HEV mode, the clutch 5 is brought into the engaged state to allow the rotational power of the engine 2 to be transmitted to the drive wheel 8 through the transmission 4. In the HEV mode, the electric motor 3 is brought into the driving state during acceleration, while during deceleration, the electric motor 3 is brought into the regeneration state. The transient mode is a switching control mode which occurs in the process of transition from the EV mode to the HEV mode.

A transient state where the clutch 5 is disengaged and then the engine 2 is stopped occurs also in the process of transition from the HEV mode to the EV mode. Although not shown in FIG. 2, the travel modes of the vehicle 1 may include an engine vehicle mode (EGV mode) where the engine 2 is operated with the electric motor 3 not in operation and where the drive wheel 8 is driven by only the rotational power of the engine 2.

Figure 3:
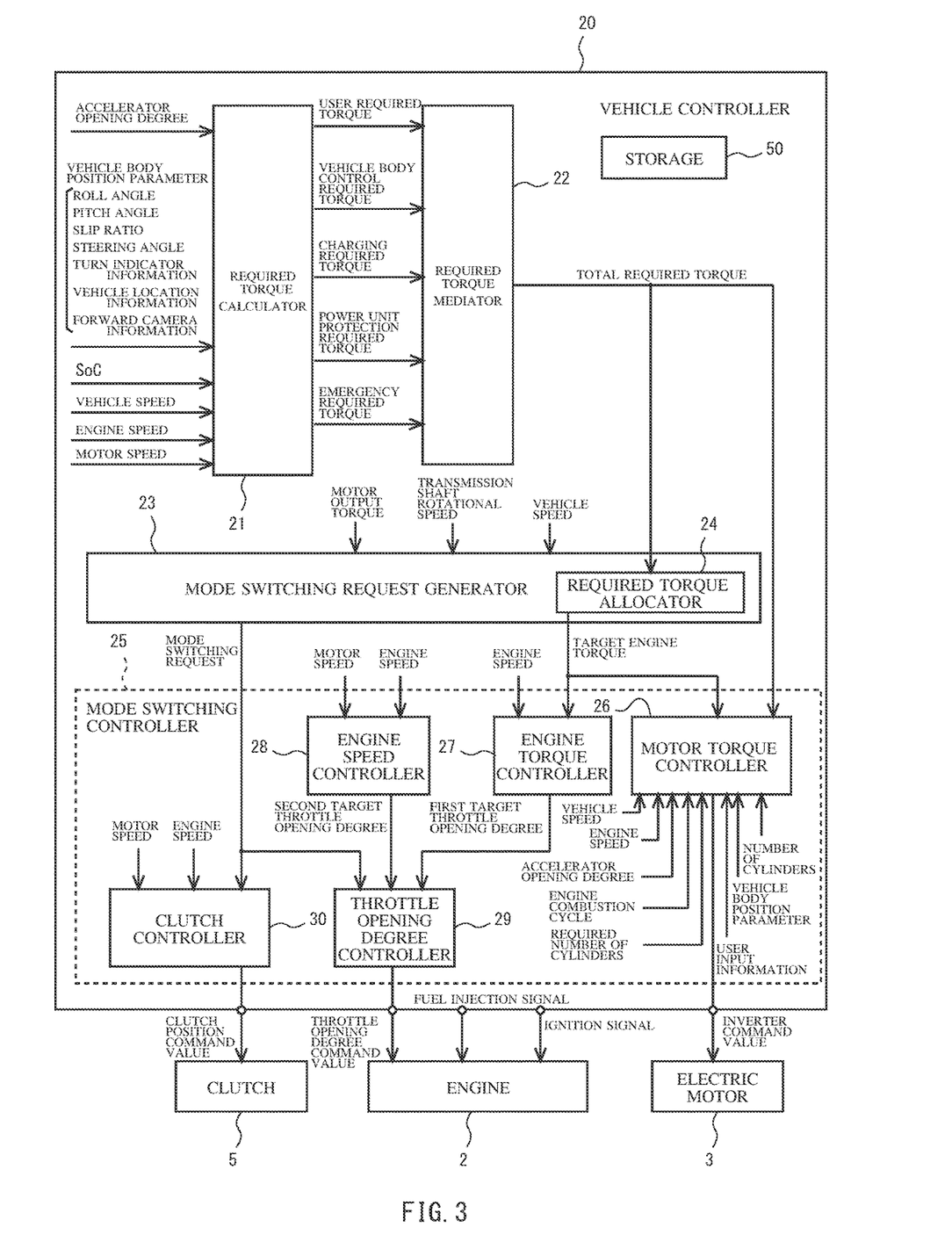
FIG. 3 is a block diagram of a controller of the vehicle of FIG. 1.

FIG. 3 is a block diagram of the vehicle controller 20 of the vehicle 1 of FIG. 1. As shown in FIG. 3, the vehicle controller 20 includes a storage 50, a required torque calculator 21, a required torque mediator 22, a mode switching request generator 23, a required torque allocator 24, and a mode switching controller 25. The elements 21 to 25 of the vehicle controller 20 are configured as a functional block implemented through processing that the processor performs using the volatile memory based on programs stored in the storage 50 including the non-volatile memory.

The required torque calculator 21 calculates various required torques based on the travel state of the vehicle 1. The various required torques are calculated from parameters such as accelerator opening degree, vehicle body position parameter, state of charge (SOC), vehicle speed, engine speed, and motor speed. The various required torques include, for example, user (rider) required torque, vehicle body control required torque, charging required torque, power unit protection required torque, and emergency required torque.

The user required torque is a torque calculated from the accelerator opening degree or any other parameter based on the output state desired by the user. The accelerator opening degree refers to the amount of accelerator operation by the user and can be acquired from an output of an accelerator opening degree sensor.

The vehicle body control required torque is a torque required in terms of the vehicle body regardless of the amount of accelerator operation by the user for purposes such as falling prevention control. The vehicle body control required torque is determined based on parameters such as the vehicle body position parameter, vehicle speed, engine speed, and motor speed. The vehicle speed is calculated, for example, from a detection value of a rotational speed sensor for the driven wheel (e.g., the front wheel), and may be calculated from GPS information or any other information. The motor speed is calculated, for example, from a detection value of a rotational speed sensor mounted on the rotational shaft of the electric motor 3, and may be calculated from a control signal for the electric motor 3. The engine speed can be calculated from an output of a crank angle sensor which detects the crank angle of the crankshaft of the engine 2.

The vehicle body position parameter includes, for example, at least one selected from roll angle, pitch angle, slip ratio, steering angle, turn indicator information, vehicle location information, and forward camera information. The roll angle and the pitch angle are calculated, for example, from a detection value of an in-vehicle gyro sensor, and may be calculated from detection values of a roll angle sensor and a pitch angle sensor. The pitch angle may be calculated from the stroke amounts of the front and rear suspensions.

The slip ratio is calculated, for example, by the following equation: slip ratio=(drive wheel rotational speed−driven wheel rotational speed)/driven wheel rotational speed. The slip ratio may be the rate of increase in drive wheel rotational speed. The steering angle is calculated, for example, from a detection value of a steering angle sensor. The turn indicator information is acquired as left-turn or right-turn indicator operation information based on a signal representing an operation of the turn indicator by the user. The vehicle location information is information which is based on a detection value of a GPS sensor and map information and which represents the location of the traveling vehicle 1 on a map. The forward camera information is image information acquired by an in-vehicle camera which captures an image of the environment ahead of the vehicle 1.

The charging required torque is a torque calculated to allow the electric motor 3 to generate electricity according to the SOC (%) representing the level of charge of the high-voltage battery 9 and charge the high-voltage battery 9. When the remaining charge of the high-voltage battery 9 has decreased, the required torque calculator 21 calculates an electricity generation torque that the electric motor 3 needs to output to charge the high-voltage battery 9. This electricity generation torque is the charging required torque. The SOC can be calculated from an output of a battery level sensor.

The power unit protection required torque is a torque calculated from parameters such as the engine speed and motor speed to protect the engine 2 and the electric motor 3, such as to prevent overheating of the engine 2 and the electric motor 3. The emergency required torque is a torque calculated in the event of an emergency such as falling.

The required torque mediator 22 calculates a torque that the drive sources (the engine 2 and the electric motor 3) should output in total. This torque is referred to as a total required torque. The required torque mediator 22 performs the calculation of the total required torque based on parameters such as the priority of the various required torques calculated by the required torque calculator 21.

The mode switching request generator 23 identifies the present travel state based on the total required torque, the vehicle speed, the transmission shaft rotational speed (the rotational speed of the input shaft 4a of the transmission 4), and the motor output torque, and chooses an optimal travel mode from the plurality of travel modes described above. The transmission shaft rotational speed is calculated from a detection value of a rotational speed sensor mounted on the input shaft 4a. The mode switching request generator 23 generates a mode switching request for travel mode switching if the present travel state is different from the chosen travel mode.

The mode switching request generator 23 allocates the total required torque between the electric motor 3 and the engine 2 in a manner appropriate to the chosen travel mode. For this purpose, the mode switching request generator 23 includes the required torque allocator 24. Based on the chosen travel mode and the total required torque, the required torque allocator 24 determines a portion of the total required torque as a target torque to be output from the engine 2 (target engine torque), and outputs the determined target engine torque.

The mode switching controller 25 switches the travel mode between the EV mode and the HEV mode in response to the mode switching request. After the mode switching, the mode switching controller 25 controls the engine 2 and the electric motor 3 in a manner appropriate to the target torques determined respectively for the engine 2 and the electric motor 3 in the post-switching travel mode. In control of the engine 2, the mode switching controller 25 controls the throttle opening degree of the engine 2 based on the required torque and the engine speed. To perform such control, the mode switching controller 25 includes a motor torque controller (motor controller) 26, an engine torque controller 27, an engine speed controller 28, a throttle opening degree controller 29, and a clutch controller 30.

The motor torque controller 26, which will be described in detail later, derives a target torque to be output from the electric motor 3 (target motor torque) based on parameters such as the total required torque and the target engine torque. Based on the target motor torque, the motor torque controller 26 sends an inverter command value to the electric motor 3 (in particular, an inverter of the electric motor 3) to operate the electric motor 3 such that the output torque of the electric motor 3 is adjusted to the target motor torque.

The engine torque controller 27 determines a target value of the throttle opening degree (first target throttle opening degree) based on the engine speed and the target engine torque output from the mode switching request generator 23. The engine speed controller 28 determines, based on the engine speed and the motor speed, a target value of the throttle opening degree (second target throttle opening degree) that allows the engine speed to synchronize with the motor speed. The throttle opening degree controller 29 determines, based on the first and second target throttle opening degrees, a throttle opening degree command value to be finally output to the engine 2. The vehicle controller 20 generates a fuel injection signal based on the throttle opening degree command value and outputs the fuel injection signal to a fuel injector of the engine 2. The vehicle controller 20 further outputs an engine ignition signal to an igniter of the engine 2.

The clutch controller 30 outputs a clutch position command value to the clutch actuator 6 in response to the mode switching request. The clutch position command value is for switching the clutch 5 between the disengaged state where the drive power of the engine 2 is not transmitted to the input shaft (transmission shaft) 4a of the transmission 4 and the engaged state where the drive power of the engine 2 is transmitted to the input shaft (transmission shaft) 4a. In the present embodiment, the clutch position command value includes a command value for placing the clutch 5 in a disengaged position where the clutch 5 is in the disengaged state and a command value for placing the clutch 5 in an engaged position where the clutch 5 is in the engaged state, and further includes command values for placing the clutch 5 in a half-clutch (partially engaged) position and a stand-by position as control positions (stop positions) of the clutch 5.

Figure 4:
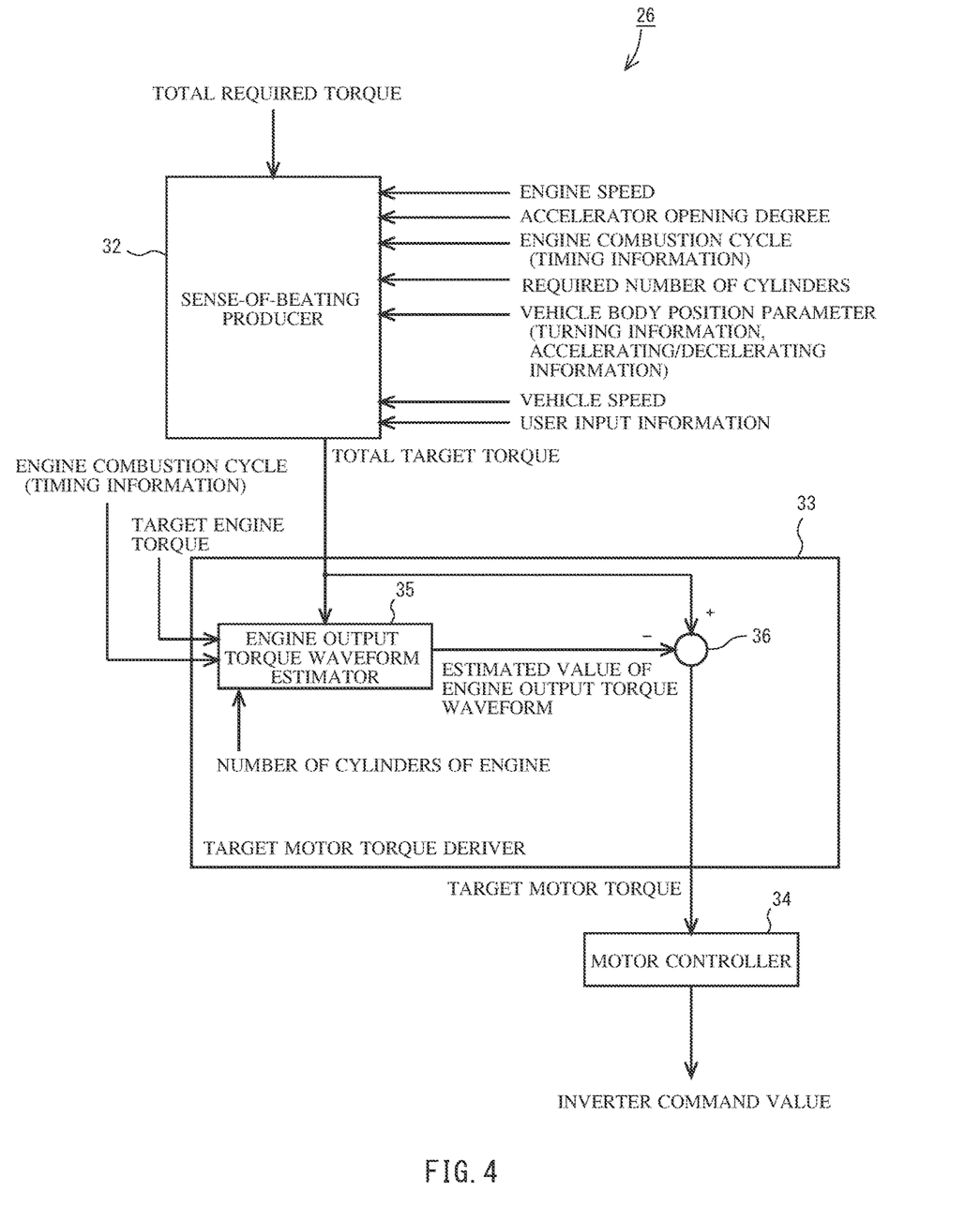
FIG. 4 is a block diagram illustrating the way in which a motor torque controller shown in FIG. 3 derives a target motor torque.

The following describes the way in which the target motor torque is derived in the vehicle 1 (engine beating accentuating control). FIG. 4 is a block diagram illustrating the way in which the motor torque controller 26 shown in FIG. 3 derives the target motor torque. As shown in FIG. 4, the motor torque controller 26 includes a sense-of-beating producer 32 and a target motor torque deriver 33 to derive the target motor torque of the present embodiment.

The sense-of-beating producer 32 acquires from the required torque allocator 24 the total required torque which is a required torque of the entire vehicle 1, and further acquires information as to the combustion cycle of the engine 2. The sense-of-beating producer 32 derives a total target torque corresponding to the total required torque as applied to the combustion cycle of the engine 2 (instantaneous torque in the combustion cycle).

Figure 5:
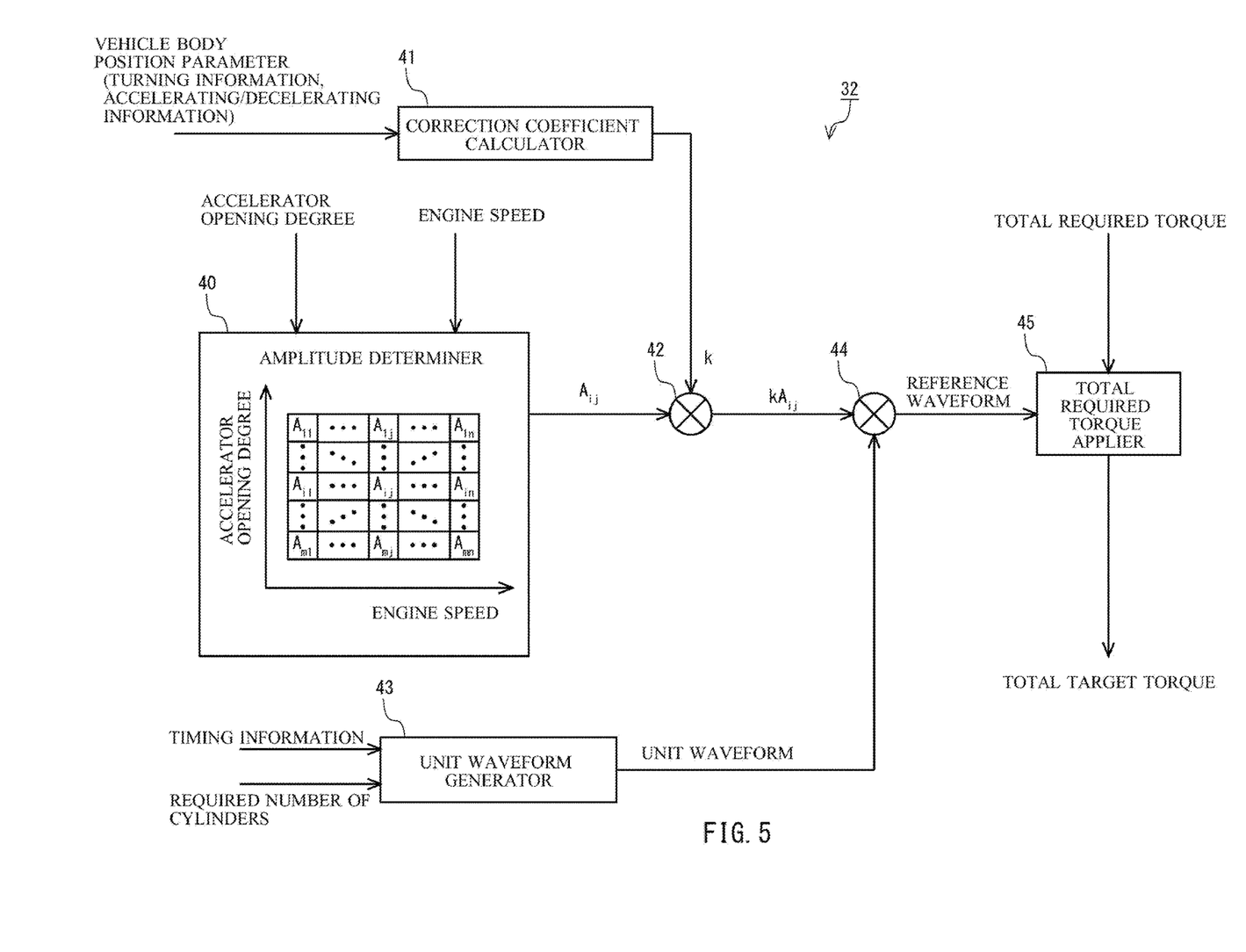
FIG. 5 is a block diagram schematically showing the way in which a sense-of-beating producer shown in FIG. 4 derives a total target torque.
Figure 6:
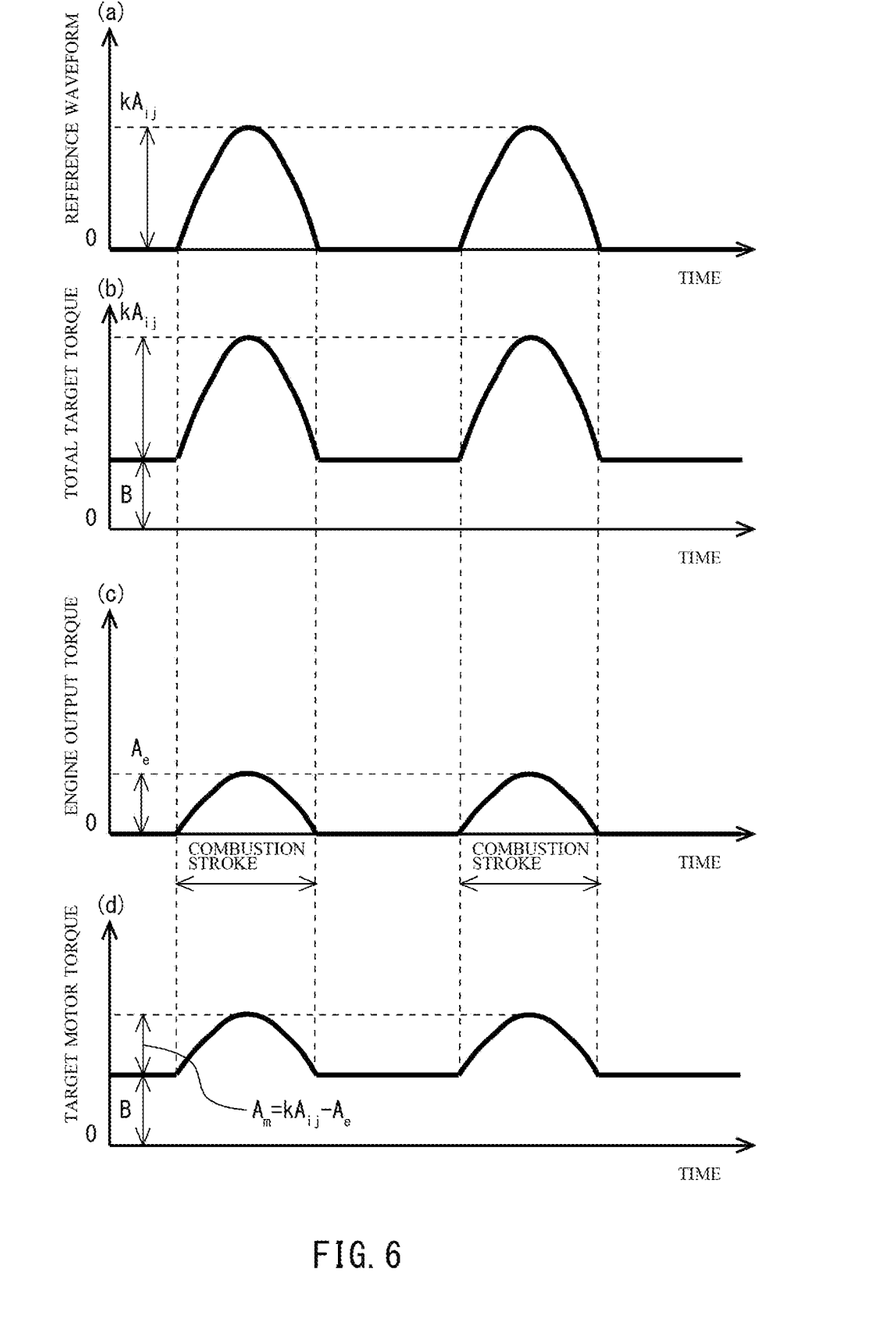
FIG. 6 presents graphs showing waveforms representing the changes over time in various torques derived in the present embodiment.

FIG. 5 is a block diagram schematically showing the way in which the sense-of-beating producer 32 shown in FIG. 4 derives the total target torque. FIG. 6 presents graphs showing waveforms representing the changes over time in the various target torques derived in the present embodiment. The graphs of FIG. 6 illustrate the case where the engine 2 is a single-cylinder engine. As shown in FIG. 5, the sense-of-beating producer 32 includes an amplitude determiner 40, a correction coefficient calculator 41, an amplitude corrector 42, a unit waveform generator 43, a reference waveform generator 44, and a total required torque applier 45.

The amplitude determiner 40 determines, based on the travel state of the vehicle 1, an amplitude $A_{ij}$ of a reference waveform for deriving the total target torque. More specifically, the amplitude determiner 40 acquires the engine speed of the engine 2 and a user requested value (accelerator opening degree) which is dependent on an operation input provided by the user in relation to the output of the vehicle, and determines the amplitude of the reference waveform from the engine speed and the accelerator opening degree. The storage 50 of the vehicle controller 20 stores map data $A_{11}$ to $A_{mn}$ for determining the amplitude $A_{ij}$ of the reference waveform according to the combination of the engine speed and the accelerator opening degree. The amplitude determiner 40 determines the amplitude $A_{ij}$ of the reference waveform based on the map data.

There is no particular limitation on the amplitude values $A_{ij}$ in the map data. For example, if the accelerator opening degree is greater than a first reference value, the amplitude may be set greater than a reference value, while if the accelerator opening degree is smaller than a second reference value equal to or smaller than the first reference value, the amplitude may be set equal to or smaller than the reference value. In this case, during acceleration of the vehicle 1, the amplitude is increased to accentuate the sense of beating that the drive sources of the vehicle 1 produce as a whole, while during steady-speed travel of the vehicle 1, the amplitude is decreased to allow the drive sources of the vehicle 1 to exhibit flat torque characteristics as a whole. In the map data, different amplitude values $A_{ij}$ may be set in association with different combinations of the engine speed and the accelerator opening degree. In this case, the amplitude of the reference waveform for determining the total target torque can be finely adjusted depending on the combination of the engine speed and the accelerator opening degree.

The correction coefficient calculator 41 derives, based on the vehicle body position parameter of the vehicle 1, a correction coefficient k for correcting the amplitude $A_{ij}$. The amplitude corrector 42 corrects the amplitude value $A_{ij}$ of the reference waveform by multiplying the output of the amplitude determiner 40 by the derived correction coefficient k, and outputs the corrected value $kA_{ij}$. The way of deriving the correction coefficient k will be described in detail later. To mention an example, the correction coefficient k is set to 1 (i.e., the correction is not performed) if the vehicle 1 is not turning. The correction coefficient calculator 41 and the amplitude corrector 42 need not be provided (i.e., the correction taking into account the vehicle body position parameter need not be performed).

The unit waveform generator 43 acquires timing information as to the combustion cycle of the engine 2 and, based on the timing information, determines a unit waveform (phase θ) for deriving the total target torque. The timing information is estimated, for example, from detection values of the crank angle sensor mounted in the vicinity of the crankshaft of the engine 2. Alternatively, the timing information may be estimated, for example, from the engine speed and the elapsed time from the time point at which the crankshaft of the engine 2 was in a reference position where the crankshaft is in a predefined state.

When detection values of the crank angle sensor are used, for example, the crank angle sensor detects crank angle information in a plurality of combustion cycles, and the unit waveform generator 43 extracts from the crank angle information a crank angle (e.g., x degrees at the top dead center) at which the engine 2 started the combustion stroke in each combustion cycle, and determines the duration of time from when the crank angle extraction was made in the previous combustion cycle to when the crank angle extraction was made in the present combustion cycle. The unit waveform generator 43 uses this duration of time as the period of the reference waveform (total output torque waveform). The unit waveform generator 43 defines the time point of crank angle extraction in each combustion cycle as a reference time point, and outputs the elapsed time from the reference time point in the form of the phase θ.

The crank angles to be extracted are not limited to those described above. For example, crank angles at which the combustion stroke ends (or the exhaust stroke starts) may be extracted in addition to or instead of the crank angles at which the combustion stroke starts. When the engine 2 includes a plurality of cylinders, the crank angles of all the cylinders may be detected. Alternatively, the crank angle of one of the cylinders and the rotational phase difference (design value) between the cylinders may be used to estimate the states of the cylinders with respect to the phase θ.

The storage 50 of the vehicle controller 20 stores required-number-of-cylinders data representing the number of cylinders of an engine the torque waveform of which is to be reproduced by the electric motor 3. The unit waveform generator 43 generates a unit waveform based on the required-number-of-cylinders data. For example, the required number of cylinders is the same as the number of cylinders of the engine 2 (the required number of cylinders is 1 in the example of FIG. 6). For example, when the engine 2 includes a plurality of cylinders (i.e., when the required number of cylinders is two or more), the unit waveform output from the unit waveform generator 43 is a composite waveform resulting from combining the unit waveforms determined respectively for the plurality of cylinders the number of which is the required number of cylinders. The unit waveform determined for each cylinder is a waveform phase-shifted from that determined for another cylinder by an amount equal to the rotational phase difference between the cylinders (the unit waveform determined for each cylinder is a periodic torque fluctuation waveform).

The reference waveform generator 44 generates a reference waveform from the amplitude $kA_{ij}$ and the unit waveform. In the engine 2, as previously stated, the torque is generated only during the combustion stroke in the combustion cycle, and for this reason the torque output per cylinder is intermittent. Thus, when the engine 2 is a single-cylinder engine, the sense-of-beating producer 32 generates, based on the acquired timing information, a reference waveform adapted for generation of a torque which monotonically increases up to the amplitude $kA_{ij}$ and then monotonically decreases in the combustion stroke of the engine 2. Graph (a) of FIG. 6 shows the reference waveform generated when the required number of cylinders is 1 (when the engine 2 is a single-cylinder engine). When the engine 2 includes a plurality of cylinders, the reference waveform is a composite waveform resulting from combining a plurality of waveforms the number of which is equal to the number of cylinders of the engine 2, each of which has the same shape as shown in graph (a) of FIG. 6, and which are phase-shifted from one another by an amount equal to the rotational phase difference between the cylinders of the engine 2 (the composite waveform is a periodic torque fluctuation waveform).

The total required torque applier 45 sets a total target torque value (offset value) B for the strokes of the engine 2 other than the combustion stroke, and derives the total target torque. The offset value B is set such that the torque output based on the reference waveform and as a function of the required number of cylinders is equal to the total required torque. As seen from the following description, any offset value B is ultimately the value of a torque to be output from the electric motor 3. Graph (b) of FIG. 6 shows a waveform representing the change over time in the total target torque.

The offset value B may be positive, zero, or negative. When the offset value B is negative, the target motor torque may be negative. In this case, the electric motor 3 is operated for regeneration.

The target motor torque deriver 33 derives a target motor torque for torque control of the electric motor 3 based on the total target torque. The target motor torque deriver 33 includes an engine output torque waveform estimator 35 and a target motor torque calculator 36.

The engine output torque waveform estimator 35 acquires the target engine torque from the required torque allocator 24 and estimates from the target engine torque an engine output torque waveform representing an engine output torque in the combustion cycle of the engine 2. Further, the engine output torque waveform estimator 35 acquires information as to the number of cylinders of the engine 2 and the timing information as to the combustion cycle of engine 2, and generates (or estimates) a waveform of an engine output torque per cylinder such that the sum of the output toques of all the cylinders of the engine 2 is equal to the target engine torque.

That is, the engine output torque waveform is generated based on a torque value obtained by dividing the target engine torque by the number of cylinders. The number of cylinders of the engine 2 is pre-stored in the storage 50 of the vehicle controller 20. As shown in graph (c) of FIG. 6, the waveform of the engine output torque per cylinder is such that the torque (amplitude $A_e$) is generated only during the combustion stroke of the engine 2 and is zero during the other strokes.

The target motor torque calculator 36 calculates the target motor torque by subtracting the estimated value of the engine output torque waveform from the total target torque. As shown in graph (d) of FIG. 6, the waveform representing the change over time in the target motor torque is such that a torque corresponding to the offset value B is generated during the strokes of the engine 2 other than the combustion stroke and that a torque corresponding to the offset value B plus an amplitude $A_m$ ($=kA_{ij}-A_e$) is generated during the combustion stroke.

The motor controller 34 controls the electric motor 3 based on the target motor torque. More specifically, the motor controller 34 generates a command value (inverter command value) to be provided to the inverter of the electric motor 3 based on the target motor torque, and outputs the command value to the electric motor 3.

In the configuration described above, the torque output from the electric motor 3 is a target torque tailored to the combustion cycle of the engine 2. Thus, the total torque which is the sum of the torque output from the electric motor 3 and the torque output from the engine 2 (the torque output from the entire vehicle 1) is adjusted to the total target torque tailored to the combustion cycle of the engine 2 (the waveform shown in graph (b) of FIG. 6). As such, in a travel mode (HEV mode) where drive power is generated by both the engine 2 and the electric motor 3, a sense of beating (torque feeling) can be offered to the user as if the vehicle 1 was traveling by using the drive power of the engine 2 alone, and the offering of sense of beating can be achieved without sacrificing the operational efficiency of the engine 2. Additionally, in the above configuration where the total target torque is derived in consideration of the actual operational state of the engine 2, the total target torque can be appropriately derived to fit the actual state of the engine 2.

Figure 9:
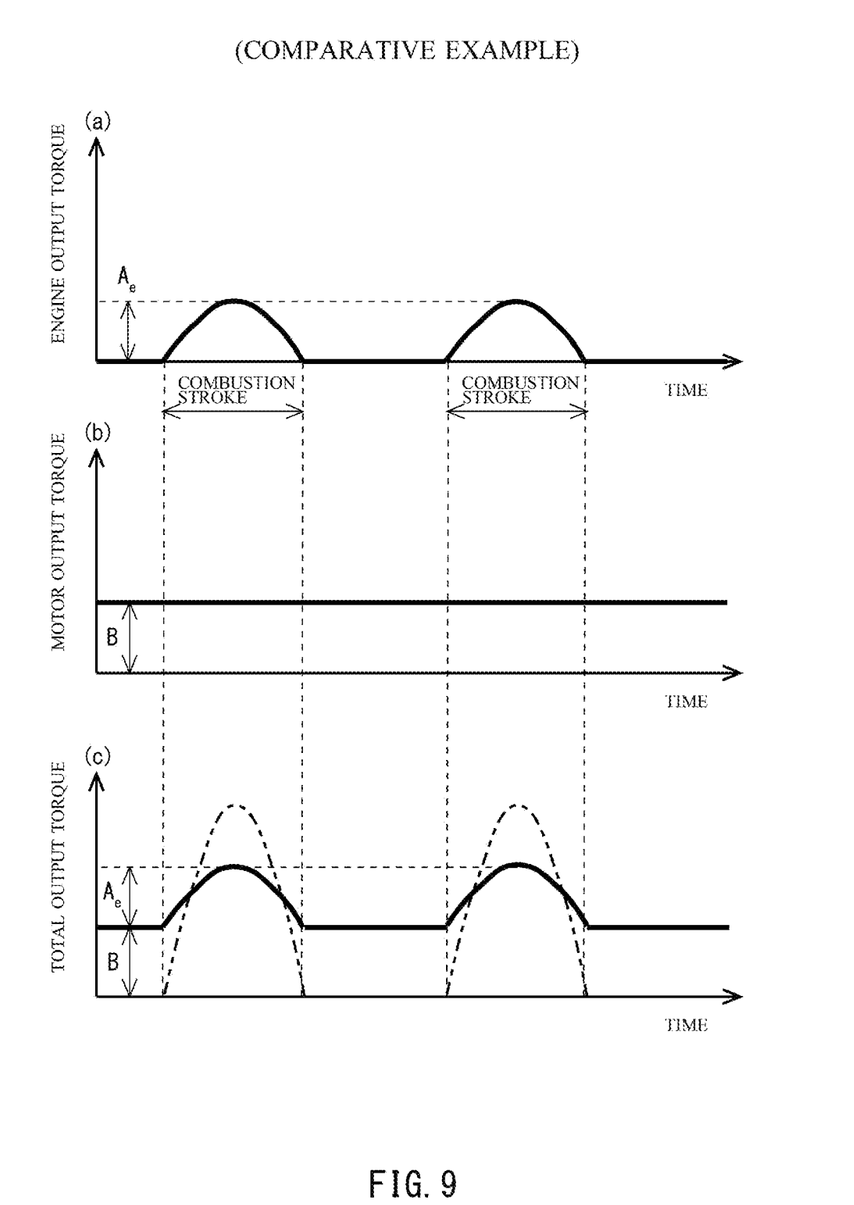
FIG. 9 presents graphs showing waveforms representing the changes over time in output torques in a comparative example.

FIG. 9 presents graphs showing output torque waveforms in a comparative example. The comparative example of FIG. 9 illustrates the change over time in total output torque as observed when the engine output torque output from the engine 2 is the same as that in the example of FIG. 6 and the waveform of the motor output torque output from the electric motor 3 is flat (the electric motor 3 outputs a constant torque). In FIG. 9, graph (a) shows the waveform of the engine output torque, graph (b) shows the waveform of the motor output torque, and graph (c) shows the waveform of the total output torque.

As shown in FIG. 9, when the waveform of the motor output torque is flat, the amount of torque fluctuation (amplitude) exhibited in the waveform of the total output torque during the combustion stroke of the engine 2 is equal to only the amount of torque fluctuation of the engine 2. Thus, the sense of beating produced by the engine 2 is diminished as compared to that produced in the case where the engine 2 alone bears the burden of generating the total required torque (the total output torque in this case is shown by an imaginary line in graph (c) of FIG. 9), and the torque output waveform is unnatural. In contrast, in the present embodiment, even when the engine 2 and the electric motor 3 share the burden of generating the total required torque, the torque fluctuation can be made similar to that which occurs when the engine 2 alone bears the burden of generating the total required torque, and the sense of beating produced by the engine 2 can be accentuated.

Concerning the generation of the total output torque waveform, an example of the way of amplitude correction taking into account the vehicle body position parameter including turning information will now be described. As stated above, the correction coefficient calculator 41 of the sense-of-beating producer 32 acquires the turning information and determines the correction coefficient k by which the amplitude $A_{ij}$ of the reference waveform as determined by the amplitude determiner 40 is multiplied. Thus, the sense-of-beating producer 32 changes the amplitude $A_{ij}$ of the reference waveform for derivation of the total target torque according to the turning state (in particular, the sense-of-beating producer 32 corrects the amplitude $A_{ij}$ to an amplitude $kA_{ij}$).

In the present embodiment, the vehicle 1 is a leaning turn-type straddle vehicle which turns with the vehicle body tilted in a direction intersecting the travel direction of the vehicle. Thus, the correction coefficient calculator 41 acquires the tilt angle (roll angle) of the vehicle 1 as the turning information. The correction coefficient calculator 41 determines that the vehicle 1 is turning if the roll angle of the vehicle 1 is equal to or greater than a predetermined angle. The correction coefficient calculator 41 further acquires the vehicle speed of the vehicle 1, and determines whether the vehicle 1 is accelerating (acquires accelerating/decelerating information) based on a change in vehicle speed. The correction coefficient calculator 41 determines that the vehicle 1 is accelerating if the amount of change in vehicle speed of the vehicle 1 per unit time has increased to or above a reference value.

If the vehicle 1 is turning and in an accelerating state, the sense-of-beating producer 32 increases the amplitude of the reference waveform, while if the vehicle 1 is turning and in a state other than the accelerating state, the sense-of-beating producer 32 decreases the amplitude of the reference waveform. More specifically, if the acquired roll angle is within a first range predetermined for the roll angle of the vehicle 1 and the vehicle 1 is in the accelerating state, the sense-of-beating producer 32 increases the amplitude of the reference waveform as a function of the roll angle so that the amplitude is greater than when the vehicle body is not tilted. That is, the correction coefficient calculator 41 sets the correction coefficient k to a value appropriate to the roll angle and greater than 1.

If the roll angle is within a predetermined second range and the vehicle 1 is in a state other than the accelerating state, the sense-of-beating producer 32 decreases the amplitude of the reference waveform as a function of the roll angle so that the amplitude is smaller than when the vehicle body is not tilted. That is, the correction coefficient calculator 41 corrects the correction coefficient k to a value appropriate to the roll angle and smaller than 1. The "state other than the accelerating state" includes a state where the vehicle 1 is decelerating and a state where the vehicle 1 is traveling at a steady speed. The first range and the second range may be the same or different.

For example, the storage 50 stores a tilt angle-versus-correction coefficient k relationship for use in the accelerating state and a tilt angle-versus-correction coefficient k relationship for use in the state other than the accelerating state, and these relationships are stored in the form of map data. If it is determined that the vehicle 1 is turning and in the accelerating state, the correction coefficient calculator 41 accesses the map data for use in the accelerating state and retrieves the correction coefficient k stored in association with the tilt angle as acquired at the moment. Likewise, if it is determined that the vehicle 1 is turning and in the state other than the accelerating state, the correction coefficient calculator 41 accesses the map data for use in the state other than the accelerating state and retrieves the correction coefficient k stored in association with the tilt angle as acquired at the moment.

In the above configuration, since the amplitude $kA_{ij}$ of the reference waveform for deriving the total required torque is changed according to the turning state of the vehicle 1, a sense of beating matching the turning state can be created. Further, in the above configuration, the sense of beating is enhanced when the vehicle 1 is turning and in the accelerating state. Thus, the vividness of information (grip feeling) that the user receives from the vehicle 1 which is turning and accelerating can be increased, and the operation feeling of the user can be improved. When the vehicle 1 is turning and in the state other than the accelerating state, the sense of beating is lessened. Thus, the vividness of information that the user receives from the vehicle 1 which is turning in the state other than the accelerating state can be reduced, and the turning of the vehicle can be kept stable.

In the above configuration, since the amplitude $kA_{ij}$ of the reference waveform is adjusted as a function of the tilt angle (roll angle) of the vehicle 1, a sense of beating best suited for the tilt angle of the vehicle 1 can be created.

The tilt angle used for determination as to the turning state may be a detection value of an in-vehicle gyro sensor or roll angle sensor or may be calculated through analysis of an image captured by a forward camera. The determination as to the turning state may be made based on the steering angle, turn indicator information, or vehicle location information. While in the above configuration the amplitude $kA_{ij}$ of the reference waveform is set (or the value of the correction coefficient k is set) according to the tilt angle during turning, the amplitude correction during turning may be performed using a fixed correction coefficient k ($\approx$1) regardless of the tilt angle.

While in the above configuration the amplitude correction is not performed (k=1) if the vehicle 1 is not turning, the amplitude $A_{ij}$ of the total output torque waveform may be corrected according to the accelerating/decelerating state of the vehicle 1 even when the vehicle 1 is not turning. For example, if it is determined that the vehicle 1 is accelerating, the sense-of-beating producer 32 may increase the amplitude of the reference waveform so that the amplitude is greater than when the vehicle 1 is traveling at a steady speed (k>1), while if it is determined that the vehicle 1 is decelerating, the sense-of-beating producer 32 may decrease the amplitude of the reference waveform so that the amplitude is smaller than when the vehicle 1 is traveling at a steady speed (k<1). In this case, the map data used by the amplitude determiner 40 may be amplitude data independent of the accelerator opening degree (i.e., data of amplitude values associated only with the engine speed).

The engine beating accentuating control as described above may be executed whenever the vehicle 1 is in the HEV mode. Alternatively, whether or not the control is executed may be chosen based on an operation input provided by the user. For example, the vehicle 1 may include an operation device 15 to which the user can provide an operation input. The information input by the user to the operation device 15 is sent as user input information to the vehicle controller 20. The operation device 15 may include a switch for switching between enabling and disabling the engine beating accentuating control. The operation device 15 may include a correction setting switch for choosing whether the correction coefficient k is set (the correction is carried out) according to the turning state.

Alternatively, the vehicle controller 20 may determine whether to execute the engine beating accentuating control as described above according to the travel state (such as the vehicle body position parameter and the vehicle speed) of the vehicle 1.

The engine beating accentuating control as described above may be executed in the EV mode as well as in the HEV mode. In this case, the total target torque derived by the sense-of-beating producer 32 corresponds to the target motor torque. In this case, the sense-of-beating producer 32 acquires the vehicle speed of the vehicle 1 and simulates the combustion cycle of the engine 2 based on the acquired vehicle speed to calculate an imaginary engine speed. The sense-of-beating producer 32 derives an imaginary combustion cycle (another timing information) based on the imaginary engine speed. The sense-of-beating producer 32 uses the imaginary timing information and the imaginary engine speed to derive the total target torque.

Since the combustion cycle of the engine 2 is simulated based on the vehicle speed of the vehicle 1, a sense of beating similar to that provided when the engine 2 is in operation can be created in the EV mode where the engine 2 is at rest.

While in the example described above the required number of cylinders is set equal to the number of cylinders of the engine 2, the required number of cylinders may be different from the number of cylinders of the engine 2. When the required number of cylinders and the number of cylinders of the engine 2 are different, a sense of beating matching a desired number of cylinders can be produced regardless of the number of cylinders of the engine 2.

Figure 7:
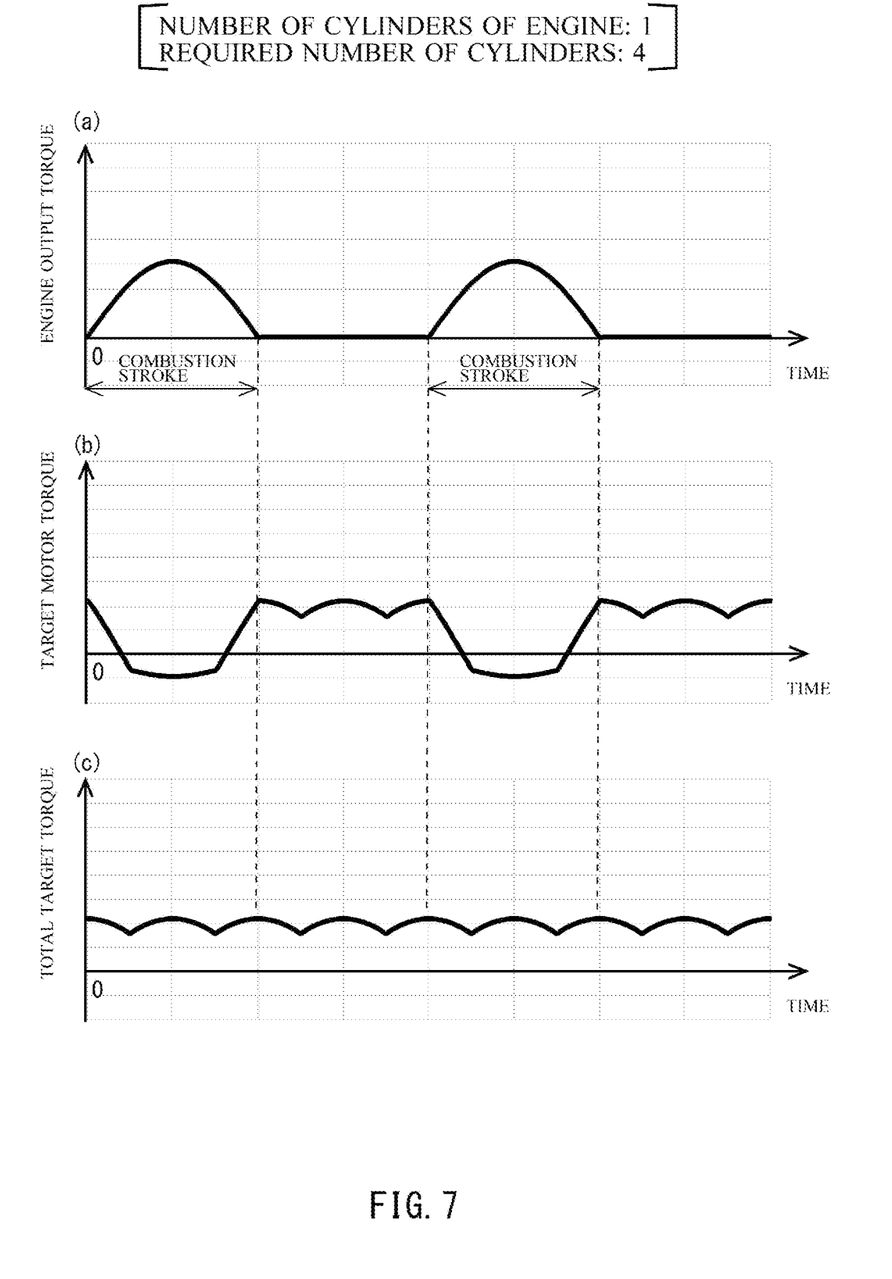
FIG. 7 presents graphs showing examples of waveforms representing the changes over time in various torques for the case where the required number of cylinders and the number of cylinders of an engine are different.
Figure 8:
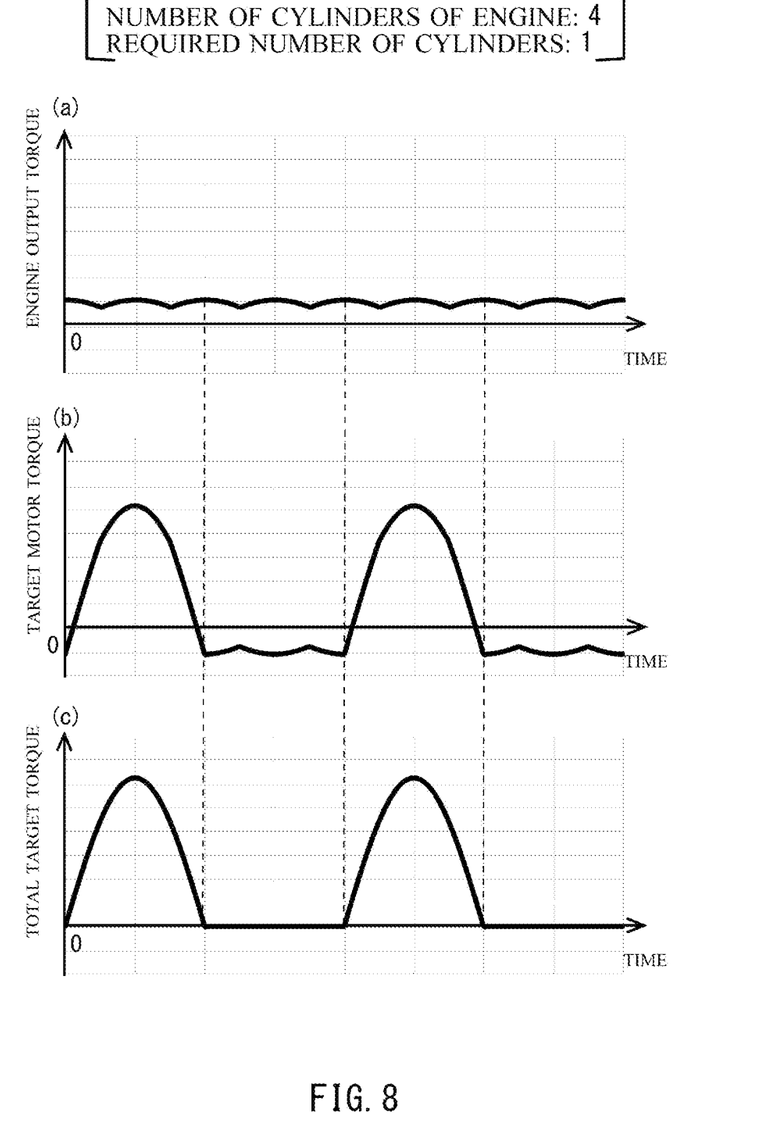
FIG. 8 presents graphs showing examples of waveforms representing the changes over time in various torques for the case where the required number of cylinders and the number of cylinders of an engine are different.

FIGS. 7 and 8 present graphs showing examples of waveforms representing the changes over time in various torques for the case where the required number of cylinders and the number of cylinders of the engine 2 are different.

The graphs of FIG. 7 illustrate the case where the engine 2 is a single-cylinder engine (the number of cylinders=1) and where the required number of cylinders is 4. The engine output torque is intermittent as shown in graph (a) of FIG.

7 since the actual engine 2 has a single cylinder. As shown in graph (c) of FIG. 7, when a four-cylinder engine is simulated, the waveform representing the change over time in the total target torque has four cycles (torque peaks) per cycle of the engine 2. In this case, as shown in graph (b) of FIG. 7, the waveform representing the change over time in the target motor torque is a waveform resulting from subtracting the engine output torque waveform, which is discrete, from the total target torque waveform which is relatively flat.

The graphs of FIG. 8 illustrate the case where the engine 2 is a four-cylinder engine and where the required number of cylinders is 1. The engine output torque is relatively flat as shown in graph (a) of FIG. 8 since the actual engine 2 has four cylinders. As shown in graph (c) of FIG. 8, when a single-cylinder engine is simulated, the waveform representing the change over time in the total target torque is a discrete output waveform. In this case, as shown in graph (b) of FIG. 8, the waveform representing the change over time in the target motor torque is a waveform resulting from subtracting the engine output torque waveform, which is relatively flat, from the total target torque waveform which is discrete.

As described above, a sense of beating provided by an engine having a desired number of cylinders can be produced regardless of the actual number of cylinders of the engine 2. This allows for production of a preferred sense of beating matching the preference of the user. For example, even when the vehicle 1 is an entry-level vehicle having a small number of cylinders, good torque feeling can be offered to the user as if the vehicle 1 incorporated a multi-cylinder engine.

When the required number of cylinders and the number of cylinders of the engine 2 are different, the required number of cylinders may be a fixed value pre-stored in the storage 50, or the user may select a desired number of cylinders from a plurality of choices. For example, the operation device 15 may include a number-of-cylinders input switch for selectively inputting the required number of cylinders. The vehicle controller 20 may automatically change the required number of cylinders according to the travel state (such as the vehicle body position parameter and the vehicle speed) of the vehicle 1 when executing the engine beating accentuating control. For example, during acceleration, the required number of cylinders may be reduced to accentuate the sense of beating, while during deceleration, the required number of cylinders may be increased to make the deceleration stable.

While an exemplary embodiment has been described above, the present disclosure is not limited to the above embodiment. Various modifications, changes, and adaptations can be made without departing from the gist of the present disclosure.

For example, while in the above embodiment the vehicle 1 implementing the engine beating accentuating control is a hybrid vehicle including the engine 2 and the electric motor 3 as drive sources, the present disclosure is applicable to an electric vehicle including the electric motor 3 as a drive source and devoid of the engine 2. The engine beating accentuating control in the electric vehicle is executed in the same manner as the engine beating accentuating control in the EV mode of the hybrid vehicle described above. Also in the case of such an electric vehicle, an imaginary engine combustion cycle is derived from the vehicle speed of the vehicle. Thus, despite the vehicle being devoid of an engine, a sense of beating similar to that provided when an engine is in operation can be created.

While in the above embodiment the amplitude determiner 40 determines the amplitude $A_{ij}$ using map data in which amplitude values are set in association with various combinations of the engine speed and the accelerator opening degree, the way of determining the amplitude $A_{ij}$ is not limited to that in the above embodiment. For example, a predefined correlation function describing the relationship of the amplitude versus the engine speed may be used to determine the amplitude $A_{ij}$. Alternatively, the range of the accelerator opening degree or the engine speed may be divided into a plurality of zones, and a value of the amplitude $A_{ij}$ may be assigned to each zone.

What is claimed is:

1. A vehicle controller for a vehicle including a drive source including an electric motor and an engine, the vehicle controller comprising a processor configured to:
    acquire a total required torque which is a required torque of the entire vehicle;
    acquire information as to a combustion cycle of the engine;
    derive a total target torque corresponding to the total required torque as applied to the combustion cycle of the engine;
    allocate a portion of the total required torque as a target engine torque which is a target torque to be output from the engine;
    estimate an engine output torque waveform from the target engine torque, the engine output torque waveform representing an engine output torque in the combustion cycle of the engine;
    derive a target motor torque for torque control of the electric motor by subtracting an estimated value of the engine output torque waveform from the total target torque; and
    control the electric motor based on the target motor torque.

2. The vehicle controller according to claim 1, wherein the processor is configured to:
    acquire a vehicle speed of the vehicle;
    calculate an imaginary engine speed based on the vehicle speed;
    derive an imaginary engine combustion cycle based on the imaginary engine speed; and
    derive the total target torque corresponding to the total required torque as applied to the imaginary engine combustion cycle.

3. The vehicle controller according to claim 1, wherein the processor is configured to execute control for switching between a first travel mode where the engine is stopped and a drive wheel of the vehicle is driven by drive power generated by the electric motor and a second travel mode where drive power generated by the engine is transmitted to the drive wheel.

4. The vehicle controller according to claim 3, wherein in the first travel mode, the processor uses the total target torque as the target motor torque.

5. A vehicle controller for a vehicle including a drive source including an electric motor and an engine, the vehicle controller comprising a processor configured to:
    acquire a total required torque which is a required torque of the entire vehicle;
    acquire information as to a combustion cycle of the engine;
    derive a total target torque corresponding to the total required torque as applied to the combustion cycle of the engine;

allocate a portion of the total required torque as a target engine torque which is a target torque to be output from the engine;

estimate an engine output torque waveform from the target engine torque, the engine output torque waveform representing an engine output torque in the combustion cycle of the engine;

derive a target motor torque for torque control of the electric motor by subtracting an estimated value of the engine output torque waveform from the total target torque;

control the electric motor based on the target motor torque;

acquire timing information as to the combustion cycle of the engine;

determine a unit waveform from the timing information, the unit waveform being for deriving the total target torque;

acquire an engine speed of the engine and a user requested value which is dependent on an operation input provided by a user in relation to an output of the vehicle;

determine an amplitude from the engine speed and the user requested value, the amplitude being for deriving the total target torque; and generate a reference waveform from the unit waveform and the amplitude, the reference waveform representing a change over time in the total target torque.

6. The vehicle controller according to claim 5, wherein the processor is configured to determine the amplitude based on map data, the map data being for determining the amplitude according to a combination of the engine speed and the user requested value.

7. The vehicle controller according to claim 5, wherein the vehicle is a straddle vehicle having a vehicle body tiltable in a direction intersecting a travel direction of the vehicle, and the processor is configured to acquire turning information as to a turning state of the vehicle and change the amplitude according to the turning state.

8. The vehicle controller according to claim 7, wherein the processor is configured to increase the amplitude if the vehicle is turning and in an accelerating state and decrease the amplitude if the vehicle is turning and in a state other than the accelerating state.

9. The vehicle controller according to claim 7, wherein the processor is configured to:

acquire a tilt angle of the vehicle as the turning information;

if the acquired tilt angle is within a predetermined first range and the vehicle is in an accelerating state, increase the amplitude as a function of the tilt angle so that the amplitude is greater than when the vehicle body is not tilted; and if the acquired tilt angle is within a predetermined second range and the vehicle is in a state other than the accelerating state, decrease the amplitude as a function of the tilt angle so that the amplitude is smaller than when the vehicle body is not tilted.

10. A method of controlling a vehicle including a drive source including an electric motor and an engine, the method comprising:

acquiring a total required torque which is a required torque of the entire vehicle;

acquiring timing information as to a combustion cycle of the engine;

deriving a total target torque from the timing information, the total target torque corresponding to the total required torque as applied to the combustion cycle of the engine;

deriving a target motor torque for torque control of the electric motor from the timing information, the target motor torque being tailored to the combustion cycle of the engine;

estimating an engine output torque waveform from the timing information and the target engine torque, the engine output torque waveform representing an engine output torque in the combustion cycle of the engine;

deriving the target motor torque by subtracting an estimated value of the engine output torque waveform from the total target torque; and controlling the electric motor based on the target motor torque.

11. The method according to claim 10, further comprising:

acquiring a total required torque which is a required torque of the entire vehicle;

deriving a total target torque from the timing information, the total target torque corresponding to the total required torque as applied to the combustion cycle of the engine; and using the total target torque as the target motor torque upon switching to a travel mode where the engine is stopped and a drive wheel of the vehicle is driven by drive power generated by the electric motor.

* * * * *